July 15, 1958

J. E. JONES 2,843,490

SUPERSENSITIZING COMBINATIONS COMPRISING
MESO-SUBSTITUTED CARBOCYANINE DYES
AND POLYVALENT METAL SALTS

Filed March 8, 1955

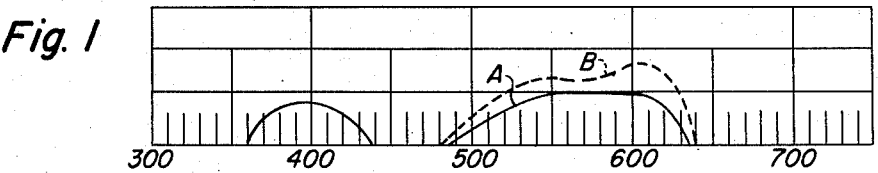

Fig. 1

A = 3,3'- DIETHYL -9- PHENYLTHIACARBOCYANINE IODIDE

B = 3,3'- DIETHYL -9- PHENYLTHIACARBOCYANINE IODIDE WITH
CADMIUM CHLORIDE

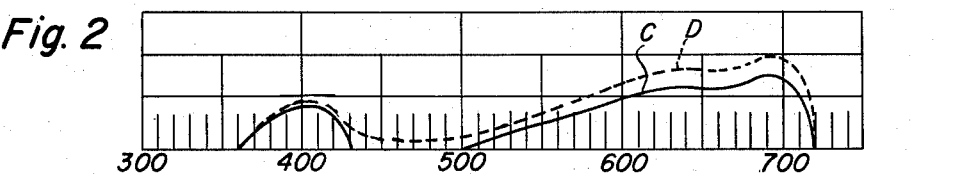

Fig. 2

C = 3,3'- DIMETHYL -9- (2 OR 3- PYRRYL) -4,5,4',5'-DIBENZOTHIACARBO-
CYANINE-p- TOLUENESULFONATE

D = 3,3'- DIMETHYL -9- (2 OR 3- PYRRYL) -4,5,4',5'- DIBENZOTHIACARBO-
CYANINE -p- TOLUENESULFONATE WITH CADMIUM CHLORIDE

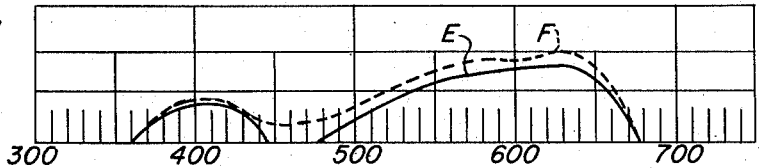

Fig. 3

E = 3,3'- DIETHYL- 5,5',7- TRIPHENYLTHIAZOLOCARBOCYANINE IODIDE

F = 3,3'- DIETHYL- 5,5',7- TRIPHENYLTHIAZOLOCARBOCYANINE IODIDE
WITH CADMIUM CHLORIDE

JEAN E. JONES
INVENTOR.

BY

ATTORNEYS

United States Patent Office 2,843,490
Patented July 15, 1958

2,843,490

SUPERSENSITIZING COMBINATIONS COMPRISING MESO-SUBSTITUTED CARBOCYANINE DYES AND POLYVALENT METAL SALTS

Jean E. Jones, Rochester, N. Y., assignor to Eastman Kodak Company, Rochester, N. Y., a corporation of New Jersey Application March 8, 1955, Serial No. 493,040

20 Claims. (Cl. 96—104)

This invention relates to photographic emulsions containing meso-substituted carbocyanine dyes, and in supersensitizing combination therewith, certain metal salts.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing cyanine dyes. Since the conditions in the emulsion, i. e., the hydrogen ion and/or the silver ion concentration undergo no significant change in my method, I shall designate my new method as a kind of supersensitization.

It is, therefore, an object of my invention to provide photographic emulsions containing meso-substituted carbocyanine dyes, and in supersensitizing combination therewith, certain metal salts. Another object is to provide photographic emulsions containing meso-substituted carbocyanine dyes, certain un-ionized dyes, and certain metal salts. Still another object is to provide a process for preparing these photographic emulsions. Other objects will become apparent from a consideration of the following description and examples.

The meso-substituted dyes useful in practicing my invention can advantageously be represented by the following general formula:

(I)

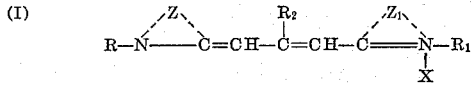

wherein R and $R_1$ each represents an alkyl group, such as methyl, ethyl, n-propyl, carbethoxymethyl, benzyl, etc. (e. g., an alkyl group containing from 1 to 2 carbon atoms, etc.), $R_2$ represents an aryl group, such as phenyl, o-, m-, and p-tolyl, 2,5-xylyl, o-, m-, and p-chlorophenyl (e. g., a mononuclear aromatic group of the benzene series), α-naphthyl, β-naphthyl, 9-phenanthryl, etc., a pyrryl group (simple or condensed nucleus), such as pyrryl, indolyl, pyrrocolyl, benzoindolyl, etc., or a thienyl group, such as 2-thienyl, 2,5-dichloro-3-thienyl, etc., X represents an acid radical, such as chloride, iodide, bromide, perchlorate, p-toluenesulfonate, benzenesulfonate, ethylsulfate, methylsulfate, etc., and Z and $Z_1$ each represents the non-metallic atoms necessary to complete a heterocyclic nucleus containing five atoms in the heterocyclic ring, e. g., a heterocyclic nucleus of the thiazole series, (e. g., thiazole, 4-methylthiazole, 4-phenylthiazole, 5-methylthiazole, 5-phenylthiazole, 4,5-dimethylthiazole, 4,5-diphenylthiazole, etc.), a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 5,6-dimethoxybenzothiazole, 5-hydroxybenzothiazole, 6-hydroxybenzothiazole, etc.), a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g., benzoselenazole, 5-chlorobenzoselenazole, 6-methoxybenzoselenazole, 5-methoxybenzoselenazole, etc.), a heterocyclic nucleus of the naphthoselenazole series (e. g., α-naphthoselenazole, β-naphthoselenazole, etc.), a heterocyclic nucleus of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), a heterocyclic nucleus of the benzoxazole series (e. g., benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e. g., α-naphthoxazole, β-naphthoxazole, etc.), etc.

The metal salts which can be used in practicing my invention advantageously include those represented by the following general formula:

(II)     $M(X_1)_2$ wherein M is a cadmium or zinc atom and $X_1$ is a chlorine or bromine atom. Cadmium chloride has been found to be particularly useful in practicing my invention, although other water-soluble salts wherein $X_1$ above is an anion other than bromide or chloride (e. g., iodide, sulfate, nitrate, acetate, etc.) can also be used in my invention (though not as advantageously, in general).

It has also been found that the dyes of Formula I above can be employed together with the metal salts of Formula II in photographic emulsions which contain certain un-ionized dyes. While improvement in speed (sensitivity) in emulsions containing the sensitizing dyes of Formula I is provided by the metal salts of Formula II, still greater speeds are possible when an un-ionized dye, as hereinafter defined, is present, and without attendant harmful effects.

The un-ionized dyes useful in practicing my invention can advantageously be represented by the following general formula:

(III)

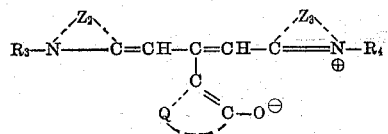

wherein $R_3$ and $R_4$ each represents an alkyl group, i. e. an alcohol radical, e. g., methyl, ethyl, n-propyl, n-butyl, β-hydroxyethyl, carbethoxymethyl, benzyl (phenyl-methyl), etc., Q represents the non-metallic atoms necessary to complete an indandione nucleus or a heterocyclic nucleus containing from 5 to 6 atoms in the heterocyclic ring, such as those of the pyrazolone series (e. g., 3-methyl-1-phenyl-5-pyrazolone, 1-phenyl-5-pyrazolone, 1-(2-benzothiazolyl-3-methyl-5-pyrazolone, etc.), those of the isoxazolone series (e. g., 3-phenyl-5-(4H)-isoxazolone, 3 - methyl - 5(4H) - isoxazolone, etc.), those of the indandione series (e. g., 1,3-diketohydrindene, etc.), those of the oxindole series, (e. g., 1-alkyl-2,3-dihydro-2-oxindoles, etc.), those of the 2,4,6-triketohexahydropyrimidine series (e. g., barbituric acid or 2-thiobarbituric acid as well as their 1-alkyl (e. g., 1-methyl, 1-ethyl, 1-n-propyl, 1-n-heptyl, etc.), or 1,3-dialkyl (e. g., 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e. g., 1,3-diphenyl, 1,3-di(p-chlorophenyl), 1,3-di(p-ethoxycarbonylphenyl), etc.), or 1-aryl (e. g., 1-phenyl, 1-p-chlorophenyl, 1-p-ethoxycarbonylphenyl), etc.) or 1-alkyl-3-aryl (e. g., 1-ethyl-3-phenyl, 1-n-heptyl-3-phenyl, etc.) derivatives, those of the rhodanine series (i. e., 2-thio-2,4-thiazolidinedione series), such as rhodanine, 3-alkylrhodanines (e. g., 3-ethylrhodanine, 3-allylrhodanine, etc.) or 3-arylrhodanines (e. g., 3-phenylrhodanine, etc.), etc., those of the 2(3H)-imidazo-[1,2-a]-pyridone series, those of the 5,7-dioxo-6,7-dihydro-5-thiazolo [3,2-a]-pyrimidine series (e. g., 5,7-dioxo-3-phenyl-6,7-dihydro-5-thiazolo [3,2-a]-pyrimidine, etc.), those of the 2-thio-2,4-oxazolidinedione series (i. e., those of the 2-thio-2,4(3H, 5H)-oxazoledione series) (e. g., 3-ethyl-2-thio-2,4-oxazolidinedione, etc.), those of the thianaphthenone series (e. g., 2(3H)-thianaphthenone, etc.), those of the 2-thio-2,5-thiazolidinedione series (i. e., the 2-thio-2,5(3H, 5H)-thiazoledione series) (e. g., 3-ethyl-2-thio-2,5-thiazolidinedione, etc.), $Z_2$ represents the non-metallic atoms necessary to complete a heterocyclic nucleus containing from 5 to 6 atoms in the heterocyclic ring, e. g., a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4 - methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, 7-hydroxybenzothiazole, etc.), a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g., benzoselenazole, 5-chlorobenzoselenazole, 6 - methoxybenzoselenazole, 5-methoxybenzoselenazole, etc.), a heterocyclic nucleus of the naphthoselenazole series (e. g., α-naphthoselenazole, β-naphthoselenazole, etc.), a heterocyclic nucleus of the naphthoxazole series (e. g., α-naphthoxazole, β-naphthoxazole, etc.), etc. and $Z_3$ represents the non-metallic atoms necessary to complete a heterocyclic nucleus of the naphthothiazole series (such as those listed above for $Z_2$) or the naphthoselenazole series (such as those listed above for $Z_2$).

Cyanine (i. e., carbocyanine) dyes represented by Formula I above wherein $R_2$ represents a pyrryl nucleus include dyes represented by the following general formula:

(IV)

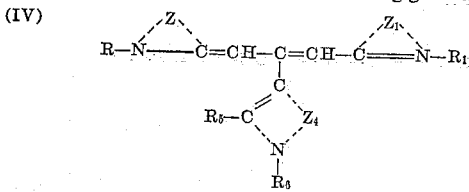

wherein R, $R_1$, X, Z, and $Z_1$ each has the values given above, $R_5$ and $R_6$ each represents a hydrogen atom, an alkyl group, such as methyl, ethyl, n-propyl, n-amyl, n-heptyl, n-dodecyl, cyclohexyl, etc. or an aryl group, such as phenyl, o-, m-, and p-tolyl, etc., and $R_5$ and $R_6$ together can represent the non-metallic atoms necessary to complete a heterocyclic nucleus of the pyridine series, and $Z_4$ represents the non-metallic atoms necessary to complete a pyrrole nucleus (includes simple or condensed pyrrole nuclei, e. g., pyrrole, indole, pyrrocoline, benzoindole, etc.).

Dyes of Formula III above which have been found to be particularly useful in practicing my invention include dyes selected from those represented by the following general formula:

(V)

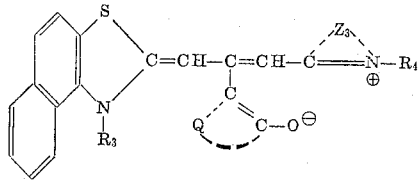

wherein $R_3$, $R_4$, $Z_3$ and Q each have the values given above. Particularly useful are those dyes wherein Q represents the non-metallic atoms necessary to complete a heterocyclic nucleus of the barbituric acid series and $Z_3$ represents the non-metallic atoms necessary to complete a heterocyclic nucleus of the naphthothiazole series or the naphthoselenazole series.

Many of the dyes represented by Formula I above wherein $R_2$ represents an aryl nucleus have been previously described in the prior art. See, for example, U. S. Patents 1,934,659 (dated November 7, 1933), 2,107,379 (dated February 8, 1938), 2,112,140 (dated March 22, 1938), 2,369,646 (dated February 20, 1945), 2,369,657 (dated February 20, 1945), 2,486,173 (dated October 25, 1949), and 2,515,913 (dated July 18, 1950).

The dyes represented by Formula I above wherein $R_2$ represents a thienyl group (or an aryl group) can be prepared according to the method described in the copending applications Serial No. 400,809 (now U. S. Patent 2,756,227, issued July 24, 1956) and Serial No. 400,810 (now U. S. Patent 2,734,900, issued February 14, 1956), both filed December 28, 1953 in the name of D. W. Heseltine.

The dyes represented by Formula I above wherein $R_2$ represents a pyrryl group (i. e., dyes of Formula IV can be prepared as described in U. S. Patent 2,666,761, issued January 19, 1954, and in the copending application Serial No. 395,604, filed December 1, 1953 (now U. S. Patent 2,719,151, issued September 27, 1955), in the names of D. W. Heseltine and L. G. S. Brooker.

The dyes represented by Formulas III and V above can advantageously be prepared as described in the copending application Serial No. 375,279, filed August 19, 1953 (now U. S. Patent 2,739,964, issued March 27, 1956), in the names of L. G. S. Brooker and F. L. White.

My invention is directed to the supersensitization of washed, photographic silver chloride or silver chlorobromide emulsions. Other silver halide emulsions, e. g., silver bromiodide emulsions, do not generally provide the improved supersensitizing results of my invention.

According to my invention, I incorporate one or more of the carbocyanine dyes selected from those represented by Formula I (or IV) above, alone or together with an un-ionized dye selected from those represented by Formula III or (V) with one or more of the metal salts selected from those represented by Formula II in a washed, photographic silver chloride or silver chlorobromide emulsion. My supersensitizing combinations can be employed in photographic emulsions where the carrier is gelatin, or where the carrier is other than gelatin, e. g., a resinous substance or cellulosic material which has no deteriorating effect on the light-sensitive materials.

The sensitizing dyes and metal salts can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the sensitizing dyes of Formula I (or III, IV, and V) are advantageously employed at or near their optimum concentration.

The optimum concentration of an individual sensitizing dye can be determined in a manner well known to those skilled in the art by measuring the sensitivity of a series of test portions of the same emulsion, each portion containing a different concentration of the sensitizing dye. Ordinarily, the optimum or near optimum concentrations of the dyes (total for all dyes) selected from those represented by Formula I above, which I employ in practicing my invention, are of the order of from 0.1 to 0.3 gm. per mol. of silver halide in the emulsion.

The metal salts selected from those represented by Formula II above can advantageously be employed in concentrations on the order of from 5 to 35 g. per mol. of silver halide in the emulsion.

Generally speaking, the ratio of concentration of the dyes of Formula I (or III, IV, and V) to the metal salt of Formula II can vary rather widely in my combinations, e. g., from 1:10 to 1:200 by weight in many cases.

The methods of incorporating sensitizing dyes and metal salts in emulsions are well known to those skilled in the art. The metal salts can be directly dispersed in the emulsions or they can be dissolved in water and added in the form of their aqueous solutions. While the sensitizing dyes can be directly dispersed in the emulsions, it is convenient to add the dyes in the form of solutions in appropriate solvents. Methanol, ethanol, pyridine, etc. have proven satisfactory for many of the dyes of Formula I (or III, IV and V). Acetone has also been found to be a suitable solvent in certain cases. Mixtures of solvents, e. g., pyridine diluted with methanol or acetone, can also be used. The dyes of Formula I (or III, IV and V) and the metal salts of Formula II are dispersed in the finished, washed emulsions and should be uniformly distributed throughout the emulsions. The following procedure is satisfactory: Stock solutions of the sensitizing dyes and metal salts desired are prepared by dissolving the same in appropriate solvents as described above. Then, to the flowable gelatino-silver-chloride or silver-chlorobromide emulsion, the desired amounts of the stock solution of the dyes (or metal salts) are slowly added, while stirring the emulsion. Stirring is continued until the dye (or dyes) is thoroughly incorporated in the emulsion. Then the desired amount of the stock solution of the metal salt (or dye, if metal salt has been added first) is slowly added to the emulsion, while stirring. Stirring is continued until the second solution is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art. The foregoing procedures and proportions are to be regarded only as illustrative. Clearly, my invention is directed to any washed silver chloride or silver chlorobromide emulsion containing a combination of the aforesaid sensitizing dyes and metal salts whereby a supersensitizing effect is obtained.

The metal salts of Formula II are useful not only in their supersensitizing effect, but in that they exhibit an effect in stabilizing the emulsions against fog. This concomitant effect is illustrated below.

The following examples will serve to illustrate further the manner of practicing my invention.

In Table I below, to different portions of the same batch of washed photographic gelatino-silver-chlorobromide emulsion were added (1) a cyanine dye selected from those of Formula I and (2) a combination of the cyanine dye of Formula I and cadmium chloride in the amounts shown in the table. Before coating, the emulsions were digested for a short time in a tank maintained at 52° C. The different portions of emulsion were then coated on supports and exposed in the usual manner in a spectrograph and a sensitometer (Type I$b$) through a Wratten No. 12 filter, i. e., a filter which transmits substantially no light of wavelength shorter than about 495 mu (except for about 1% between 300 and 340 mu), and the exposed emulsions developed in the usual manner. The speed (minus blue), gamma and fog for each of the coatings was then determined. The coatings in Examples 1–10 and 14 were made from the same batch of emulsion and the coatings in Examples 11, 12, and 13 were made from the same batch of emulsion. Example 14 shows that no detectable supersensitization results when a carbocyanine dye containing no chain substituent is employed.

*Table I*

| Example | Dye (g./mol. AgX) | CdCl$_2$ (g./mol. AgX) | 10/i Speed | Gamma | Fog |
|---|---|---|---|---|---|
| 1 | (a) 3,3'-dimethyl-9-phenyl-4,5,4',5'-dibenzothiacarbocyanine bromide (.20) | none | .169 | .95 | .05 |
|   | (b) dye (a) (.20) | 20.0 | .23 | 1.94 | .05 |
| 2 | (c) dye (a) (.20) with 5-[di(1-ethyl-2(1H)-β-naphthothiazolylidene) isopropylidene]-1,3-di(β-methoxyethyl) barbituric acid (.04) | none | .43 | 2.32 | .05 |
|   | (d) mixture in 2 (c) | 20.0 | 2.65 | 1.95 | .05 |
| 3 | (e) 3,3'-diethyl-9-phenylthiacarbocyanine iodide (.20) | none | .62 | 2.36 | .05 |
|   | (f) dye (e) (.20) | 20.0 | 1.80 | 2.18 | .06 |
| 4 | (g) 3,3'-dimethyl-9-(2- or 3-pyrryl)-4,5,4',5'-dibenzothiacarbocyanine-p-toluenesulfonate (.20) | none | 1.4 | 2.58 | .05 |
|   | (h) dye (g) (.20) | 20.0 | 4.70 | 1.93 | .05 |
| 5 | (i) dye (g) (.20) with 5-[(1-ethyl-2(1H)-β-naphthothiazolylidene) (1-methyl-2(1H)-β-naphthothiazolylidene)isopropylidene]-1,3-di(β-methoxyethyl) barbituric acid (.04) | none | 2.90 | 2.50 | .05 |
|   | (j) mixture in 5 (i) | 20.0 | 8.80 | 2.24 | .05 |
| 6 | (k) 3,3'-dimethyl-9-(2-thienyl)-4,5-benzothiacarbocyanine-p-toluenesulfonate (.20) | none | .096 | 2.76 | .06 |
|   | (l) dye (k) (.20) | 20.0 | .47 | 1.89 | .06 |
| 7 | (m) dye (k) (.20) with 5-[(1-ethyl-2(1H)-β-naphthothiazolylidene) (1-methyl-2(1H)-β-naphthothiazolylidene) isopropylidene]-1-n-heptyl-3-phenylbarbituric acid (.04) | none | 1.80 | 1.90 | .06 |
|   | (n) mixture in 7 (m) | 20.0 | 4.50 | 2.12 | .06 |
| 8 | (o) 3,3'-dimethyl-9-(2,5-xylyl) thiacarbocyanine iodide (.20) | none | 1.02 | 3.84 | .06 |
|   | (p) dye (o) (.20) | 20.0 | 2.70 | 2.70 | .06 |
| 9 | (q) 3,3'-diethyl-9-phenyl-4,5,4',5'-dibenzoselenathiacarbocyanine iodide (.20) | none | .65 | 3.38 | .06 |
|   | (r) dye (q) (.20) | 20.0 | 2.15 | 2.00 | .05 |
| 10 | (s) 3,3'-diethyl-9-phenylselenacarbocyanine bromide (.20) | none | .43 | 4.70 | .05 |
|   | (t) dye (s) (.20) | 20.0 | 1.55 | 3.24 | .06 |
| 11 | (u) 3,3'-diethly-9-phenyloxacarbocyanine perchlorate (.20) | none | .12 | 5.4 | .04 |
|   | (v) dye (u) (.20) | 20.0 | .27 | 2.2 | .04 |
| 12 | (w) 3,3'-diethyl-5,5',7-triphenylthiazolocarbocyanine iodide (.20) | none | 1.62 | 5.8 | .06 |
|   | (x) dye (w) (.20) | 20.0 | 4.6 | 2.8 | .05 |
| 13 | (y) 3,3'-dimethyl-4,5,4',5',7-pentaphenylthiazolocarbocyanine iodide (.20) | none | 2.3 | 4.4 | .06 |
|   | (z) dye (y) (.20) | 20.0 | 4.3 | 2.6 | .05 |
| 14 | (a') 5,5',6,6'-tetrachloro-1,1',3,3'-tetraethylbenzimidazolocarbocyanine iodide (.20) | none | 4.8 | 2.94 | .04 |
|   | (b') dye (a') (.20) | 20.0 | 5.6 | 2.12 | .04 |

In Table II below, to different portions of the same batch of washed gelatino-silver-chlorobromide (Example 1) or pure chloride (Example 2) emulsion were added (1) 3,3'-dimethyl-9-phenyl-4,5,4',5'-dibenzothiacarbocyanine bromide, (2) cadmium chloride, and (3) a combination of 3,3'-dimethyl-9-phenyl-4,5,4',5'-dibenzothiacarbocyanine bromide, and cadmium chloride, in the amounts shown in the table. In some instances, a given coating gave a speed and gamma too low to measure, designated * in the table. Before coating the emulsions were digested for a short time in a tank maintained at 52° C. The different portions of emulsion were then divided in half and coated on separate supports. The coating obtained from one-half of the portion was exposed in the usual manner in a spectograph and a sensitometer (Type Ib) through a Wratten No. 47 filter and/or a Wratten No. 25 filter, i. e., a filter which transmits substantially no light of wavelength shorter than about 580 mu and the exposed emulsions developed in the usual manner. The speed (blue and red), gamma and fog for each of the coatings was then measured. The second half of each portion of emulsion was incubated at 120° F. for one week at constant humidity and then processed in exactly the same manner as the first half. The results are recorded in the following table. The concomitant supersensitizing and stabilizing effects of the cadmium chloride are evident.

In Table III below, the coatings were made in exactly the same manner as described above with reference to Table II, except that in some cases a metal salt other than cadmium chloride was employed (indicated in table). The table shows that the anion and cation of the metal salt are important in providing the effects sought. For example, calcium chloride is effective in stabilizing the emulsion, but poor in supersensitizing. The same emulsion type (i. e., gelatino-silver-chlorobromide) was employed in arriving at the results shown in the table. The emulsions contained both 3,3'-dimethyl-9-phenyl-4,5,4',5'-dibenzothiacarbocyanine bromide (.16 g./mol. AgX) and 1,3 - diethyl - 5 - [di(1 - ethyl - 2(1H) - β - naphthothiazolylidene)isopropylidene]barbituric acid (.04 g./mol. AgX). The coatings of Examples 1–4 were made from the same batch of emulsion, the coatings of Examples 5–11 were made from the same batch of emulsion, the coatings of Examples 12–14 were made from the same batch of emulsion, and the coatings of Examples 15–19 were made from the same batch of emulsion. In Examples 1–4 the cadmium chloride was added before the dyes, and there was a heat treatment at 50° C. for 15 minutes before the dyes were added in Examples 3 and 4, while the antifoggant, benzothiazole methiodide, was added after the dyes. The cadmium chloride advantageously counteracts the adverse effects produced by the benzothiazole methiodide as shown in the table.

*Table II*

| Example | Dye (g./mol. AgX) | CdCl₂ (g./mol. AgX) | Fresh ||||| Incubation—1 Week at 120° F. |||||
|---|---|---|---|---|---|---|---|---|---|---|---|---|
| | | | Blue Light Exposure || Red Light Exposure || Fog | Blue Light Exposure || Red Light Exposure || Fog |
| | | | Speed | Gamma | Speed | Gamma | | Speed | Gamma | Speed | Gamma | |
| 1 (a) | none | none | .056 | 2.4 | | | .05 | (*) | (*) | | | .90 |
| 1 (b) | .15 | none | .045 | 1.9 | .105 | 4.2 | .05 | .073 | 2.7 | .120 | 5.0 | .14 |
| 1 (c) | none | 15.0 | .071 | 2.8 | | | .06 | .078 | 3.5 | | | .07 |
| 1 (d) | .15 | 15.0 | .062 | 3.0 | .50 | 3.4 | .07 | .065 | 3.5 | .45 | 3.9 | .08 |
| 2 (e) | none | none | .011 | 9.2 | | | .03 | .013 | 9.0 | | | .04 |
| 2 (f) | none | 15.0 | .011 | 9.0 | | | .03 | .013 | 8.6 | | | .03 |
| 2 (g) | .24 | none | | | (*) | (*) | .07 | | | (*) | (*) | .07 |
| 2 (h) | .24 | 15.0 | | | .0046 | 5.7 | .07 | | | .005 | 5.5 | .07 |

*Table III*

| Example | Addenda || Fresh ||||| Incubation—1 Week at 120° F. |||||
|---|---|---|---|---|---|---|---|---|---|---|---|---|
| | Salt | g./mol. AgX | Blue Light Exposure || Red Light Exposure || Fog | Blue Light Exposure || Red Light Exposure || Fog |
| | | | Speed | Gamma | Speed | Gamma | | Speed | Gamma | Speed | Gamma | |
| 1 (a) | none | | .086 | 1.8 | .41 | 3.2 | .05 | .065 | 1.8 | .20 | 3.7 | .12 |
| 1 (b) | CdCl₂ | 10.0 | .058 | 1.9 | 3.1 | 2.25 | .03 | .044 | 2.9 | 2.55 | 2.7 | .08 |
| 2 (c) | A | .2 | .09 | .48 | .31 | 1.04 | .04 | .076 | 1.24 | .24 | 2.24 | .03 |
| 2 (d) | A + CdCl₂ | .2 / 10.0 | .065 | 1.06 | 1.85 | 1.65 | .04 | .05 | 1.82 | 2.3 | 1.82 | .03 |
| 3 (e) | CdCl₂ | 10.0 | .055 | 3.12 | 4.2 | 2.86 | .04 | .066 | 3.24 | 4.9 | 2.98 | .06 |
| 4 (f) | CdCl₂ | 20.0 | .073 | 3.2 | 6.8 | 2.6 | .04 | .096 | 3.04 | 6.8 | 3.24 | .07 |
| 5 (g) | none | | .068 | 2.0 | 1.35 | 2.2 | .06 | .078 | 2.4 | .96 | 2.8 | .08 |
| 5 (h) | CdCl₂ | 10.0 | .068 | 3.6 | 5.4 | 2.5 | .05 | .08 | 3.6 | 5.5 | 2.6 | .05 |
| 6 (i) | KBr | 8.3 | .090 | 2.3 | 2.5 | 2.2 | .05 | .14 | 2.3 | 2.4 | 2.1 | .06 |
| 6 (j) | CdCl₂ + KBr | 10.0 / 8.3 | .076 | 3.4 | 3.9 | 2.4 | .06 | .102 | 2.8 | 3.9 | 2.1 | .06 |
| 7 (k) | CdBr₂ | 13.0 | .063 | 2.8 | 2.95 | 1.8 | .06 | .086 | 2.8 | 2.55 | 2.0 | .06 |
| 8 (l) | B | 20.0 | .080 | 3.1 | 3.7 | 3.2 | .06 | .11 | 2.8 | 4.0 | 3.1 | .06 |
| 9 (m) | C | 16.5 | .073 | 2.9 | 2.5 | 2.8 | .06 | .046 | 2.9 | 2.75 | 2.4 | .10 |
| 10 (n) | B + KCl | 20.0 / 3.7 | .078 | 3.4 | 4.3 | 2.9 | .05 | .056 | 3.3 | 3.7 | 3.3 | .06 |
| 11 (o) | C + KCl | 16.5 / 3.7 | .076 | 3.2 | 2.3 | 3.3 | .05 | .068 | 3.6 | 2.25 | 2.9 | .08 |
| 12 (p) | none | | .068 | 2.0 | 1.35 | 2.2 | .06 | .078 | 2.4 | .96 | 2.8 | .06 |
| 12 (q) | D | 16.5 | .068 | 2.2 | 1.23 | 3.0 | .06 | .048 | 1.8 | .68 | 3.0 | .06 |
| 13 (r) | E | 16.5 | .071 | 2.1 | 1.60 | 2.4 | .06 | .056 | 2.7 | 1.10 | 2.6 | .06 |
| 14 (s) | F | 16.5 | .069 | 2.1 | 1.10 | 3.0 | .06 | .045 | 2.4 | .78 | 2.9 | .06 |
| 15 (t) | none | | .073 | 1.8 | 1.95 | 2.4 | .07 | .069 | 2.64 | 1.62 | 2.7 | .15 |
| 15 (u) | ZnCl₂ | 6.7 | .062 | 3.6 | 2.0 | 4.5 | .06 | .074 | 3.0 | 1.6 | 4.0 | .07 |
| 16 (v) | Pb(NO₃)₂ | 10.0 | .052 | 3.1 | 2.6 | 3.8 | .05 | .043 | 2.9 | 1.9 | 3.4 | .06 |
| 17 (w) | LaCl₃ | 6.7 | .056 | 2.6 | 2.05 | 3.1 | .06 | .068 | 2.36 | 1.8 | 2.6 | .06 |
| 18 (x) | CaCl₂ | 6.7 | .063 | 2.3 | 1.9 | 3.3 | .06 | .076 | 2.3 | 1.78 | 2.6 | .07 |
| 19 (y) | Mg(NO₃)₂ | 6.7 | .054 | 2.6 | 1.9 | 2.6 | .06 | .076 | 2.5 | 1.9 | 2.5 | .09 |

A = benzothiazole methiodide.
B = Cd(NO₃)₂·4H₂O.
C = Cd(OOCCH₃)₂·2H₂O.
D = CoCl₂·6H₂O.
E = Co(NO₃)₂·6H₂O.
F = SrCl₂·6H₂O.

In Table IV below, to different portions of the same batch of washed gelatino-silver-chlorobromide emulsion were added (1) 3,3'-dimethyl-9-phenyl-4,5,4',5'-dibenzothiacarbocyanine bromide (.16 g./mol. AgX) and 1,3-diethyl-5-[(1-ethyl-2(1H)-β-naphthothiazolylidene)isopropylidene]barbituric acid (.04 g./mol. AgX), (2) a metal salt as identified in the table, and (3) a combination of 3,3'-dimethyl-9-phenyl-4,5,4',5'-dibenzothiacarbocyanine bromide (.16 g./mol. AgX) and 1,3-diethyl-5-[(1-ethyl-2(1H)-β-naphthothiazolylidene)isopropylidene]barbituric acid (.04 g./mol. AgX), and a metal salt in the amount shown in the table. Exposures were then made at 415 mu, 635 mu, and 695 mu in a spectrosensitometer as described in "P. S. A. Journal," vol. 16B (August 1950), page 64, and the exposed coatings developed in the usual manner. (See also, Mees—"The Theory of the Photographic Process," pages 847–865, Revised Edition, MacMillan Co., 1954.) The speed (blue and red), gamma, and fog were measured. A definite supersensitizing effect is produced by the cadmium chloride, which is evident even in the presence of the slightly desensitizing salt, benzothiazole methomethylsulfate. (Note slight change in blue sensitivity when cadmium chloride is added.) The benzothiazole methomethylsulfate was added as an antifoggant.

sensitized with 3,3'-diethyl-9-phenylthiacarbocyanine iodide and curve B represents the sensitivity of the same emulsion containing 3,3'-diethyl-9-phenylthiacarbocyanine iodide and cadmium chloride. The sensitometric measurements for these emulsions are given in Example 3 of Table I.

In Figure 2, curve C represents the sensitivity of an ordinary, washed, gelatino-silver-chlorobromide emulsion sensitized with 3,3'-dimethyl-9-(2 or 3-pyrryl)-4,5,4',5'-dibenzothiacarbocyanine-p-toluenesulfonate and curve D represents the sensitivity of the same emulsion containing 3,3'-dimethyl-9-(2 or 3-pyrryl)-4,5,4',5'-dibenzothiacarbocyanine-p'-toluenesulfonate and cadmium chloride. The sensitometric measurements for these emulsions are given in Example 4 of Table I.

In Figure 3, curve E represents the sensitivity of an ordinary, washed, gelatino-silver-chlorobromide emulsion sensitized with 3,3'-diethyl-5,5',7-triphenylthiazolocarbocyanine iodide and curve F represents the sensitivity of the same emulsion containing 3,3'-diethyl-5,5',7-triphenylthiazolocarbocyanine iodide and cadmium chloride. The sensitometric measurements for these emulsions are given in Example 12 of Table I.

The emulsions prepared in accordance with my invention can be coated in the usual manner on any suitable

Table IV

| Example | Addenda | | Relative Speed 415 mu | Gamma | Relative Speed 635 mu | Gamma | Relative Speed 695 mu | Gamma |
|---|---|---|---|---|---|---|---|---|
| | Salt | g./mol. AgX | | | | | | |
| 1 {(a) | none | | 100 | 1.42 | 340 | 1.51 | (*) | (*) |
| {(b) | CdCl₂ | 10.0 | 100 | 1.84 | 820 | 1.60 | 1,480 | 1.59 |
| 2 {(c) | A | .2 | 110 | 1.18 | 340 | 1.10 | (*) | (*) |
| {(d) | A+CdCl₂ | {.2, 10.0} | 73 | 2.18 | 610 | 1.64 | 1,260 | 1.62 |

A = benzothiazole methomethyl sulfate.

The data in Table V below were obtained in exactly the same manner as described above in Tables II and III. The silver halide emulsion used was a pure, washed gelatino-silver-chloride emulsion and a mixture of 3,3'-dimethyl-9-phenyl-4,5,4',5'-dibenzothiacarbocyanine bromide (0.3 g./mol. AgX) and 1,3-diethyl-5-[di(1-ethyl-2-(1H)-β-naphthothiazolylidene)isopropylidene]barbituric acid (0.04 g./mol. AgX) was employed. The coatings were made from the same batch of emulsion.

Table V

| Example | Addenda | | Red Light Exposure | | |
|---|---|---|---|---|---|
| | Salt | g./mol. AgX | 10/i Speed | Gamma | Fog |
| 1 {(a) | none | | .0082 | .33 | .07 |
| {(b) | CdCl₂ | 20.0 | .0094 | 4.0 | .08 |
| 2(c) | ZnCl₂ | 10.0 | .0074 | 3.62 | .07 |
| 3(d) | Pb(NO₃)₂ | 13.0 | .0068 | .60 | .08 |
| 4(e) | LaCl₃ | 10.0 | .0058 | 3.4 | .08 |
| 5(f) | CaCl₂ | 10.0 | .0084 | 3.9 | .08 |

The accompanying drawing illustrates the supersensitizing effect obtained with three of my new combinations in washed, photographic gelatino-silver-chlorobromide emulsions. Each figure of the drawing is a diagrammatic reproduction of two spectrograms. In each figure the sensitivity of the emulsion containing the dye of Formula I (or IV) is represented by the solid curve. The uppermost curve (broken line) represents the sensitivity conferred on the emulsion by the combination of the dye of Formula I and cadmium chloride.

In Figure 1, curve A represents the sensitivity of an ordinary, washed, gelatino-silver-chlorobromide emulsion support, e. g., glass, cellulose nitrate film, cellulose acetate film, polyvinylacetal resin film, paper or metal.

Photographic silver halide emulsions, such as those listed above, containing the supersensitizing combinations of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086, potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., 1942, page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. Patent No. 2,640,776; etc.; or mixtures of such addenda. Dispersing agents for color couplers, such as those set forth in U. S. Patents 2,322,027 and 2,304,940, can also be employed in the above-described emulsions.

While other metal salts, such as beryllium fluoride, zinc sulfate, nickel nitrate, calcium nitrate, etc. can be used in my new combinations, the effect produced is generally one of stabilization and the supersensitizing action is not as effective as the salts of Formula II, and cadmium chloride in particular.

Sensitizing dyes other than those of Formula I, such as certain merocyanine dyes (e. g., 3-ethyl-5-[(3-ethyl- 2(3H) - benzothiazolylidene)isopropylidene] - 2 - thio-2,4-oxazolidinedione, etc.), complex merocyanine dyes (e. g., 5-[1-ethyl-2(1H)-β-naphthothiazolylidene)-α-phenylethylidene] - 3 - β - methoxyethyl - 2 - [(3 - β-methoxyethyl) - 4 - oxo - 2 - thiono - 5 - thiazolylidene]-4-thiazolidone, etc.), dicarbocyanine dyes (e. g., 3,3'-di-β-hydroxyethylthiadicarbocyanine bromide, etc.), etc., can also be employed in combination with the metal salts of my invention, and cadmium chloride in particular, although less advantageously than the combination of the dyes of Formula I with the metal salts of Formula II.

Supersensitizing combinations comprising the dyes of Formulas I (or IV) and III (or V) have been previously described in Carroll and Jones U. S. application Serial No. 403,879, filed January 13, 1954 (now U. S. Patent 2,704,715 issued March 22, 1955), and my copending application Serial No. 444,600, filed July 20, 1954 (now U. S. Patent 2,704,720 issued March 22, 1955).

Other addenda, in addition to those listed above, can also be employed in the emulsions of my invention, such as the azaindenes (e. g., triazaindenes, tetrazaindenes, pentazaindenes, etc.). See, for example, U. S. Patents 2,444,605–9; 2,449,225–6, copending Allen et al. U. S. application Ser. No. 365,541, filed July 1, 1953 (now U. S. Patent 2,735,769, issued February 21, 1956); copending Allen et al. U. S. application Ser. No. 365,542, filed July 1, 1953 (now U. S. Patent 2,713,541, issued July 19, 1955); copending Carroll et al. U. S. application Ser. No. 365,550, filed July 1, 1953 (now U. S. Patent 2,716,062, issued August 23, 1955); Birr—"Zeit. Wiss. Phot. Photophysik Photochemie"—vol. 47 (1952), pp. 2–28, etc.

As shown in certain of the above tables, the chloride or bromide salts of my invention need not be added to the photographic emulsion as such, but that these salts can be formed in the emulsion in situ by adding a water-soluble cadmium or zinc salt (other than bromide or chloride) in the presence of a water-soluble chloride or bromide salt (other than cadmium or zinc). The following claims are intended to cover this obvious alternative in practicing my invention.

What I claim as my invention and desire secured by Letters Patent of the United States is:

1. A washed, photographic silver halide emulsion selected from the group consisting of a washed, photographic silver chloride emulsion and a washed, photographic silver chlorobromide emulsion containing (1) at least one sensitizing dye selected from those represented by the following general formula:

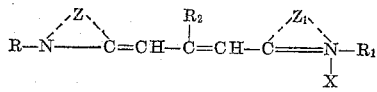

wherein R and $R_1$ each represents an alkyl group, $R_2$ represents a member selected from the group consisting of an aryl group, a pyrrl group, and a thienyl group, X represents an acid radical, and Z and $Z_1$ each represents the non-metallic atoms necessary to complete a heterocyclic nucleus containing five atoms in the heterocyclic ring selected from the group consisting of those of the thiazole series, those of the benzothiazole series, those of the naphthothiazole series, those of the benzoselenazole series, those of the naphthoselenazole series, and those of the benzoxazole series, and (2) from 5 to 35 grams per mol. of silver halide of at least one metal salt selected from those represented by the following general formula:

$$M(X_1)_2$$

wherein M represents a member selected from the group consisting of a cadmium atom and a zinc atom and $X_1$ represents a member selected from the group consisting of a chlorine atom and a bromine atom.

2. A washed, photographic gelatino-silver-chlorobromide emulsion containing (1) at least one sensitizing dye selected from those represented by the following general formula:

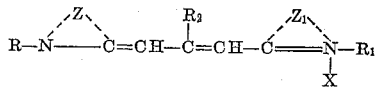

wherein R and $R_1$ each represents an alkyl group containing from 1 to 2 carbon atoms, $R_2$ represents a mononuclear aromatic group of the benzene series, X represents an acid radical, and Z and $Z_1$ each represents the non-metallic atoms necessary to complete a heterocyclic nucleus containing five atoms in the heterocyclic ring selected from the group consisting of those of the thiazole series, those of the benzothiazole series, those of the naphthothiazole series, those of the benzoselenazole series, those of the naphthoselenazole series, and those of the benzoxazole series, and (2) from 5 to 35 grams per mol. of silver halide of cadmium chloride.

3. A washed, photographic silver chlorobromide emulsion containing (1) at least one sensitizing dye selected from those represented by the following general formula:

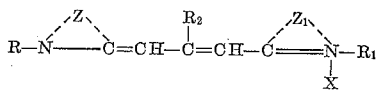

wherein R and $R_1$ each represents an alkyl group, $R_2$ represents a mononuclear aromatic group of the benzene series, X represents an acid radical, and Z and $Z_1$ each represents the non-metallic atoms necessary to complete a heterocyclic nucleus containing five atoms in the heterocyclic ring selected from the group consisting of those of the thiazole series, those of the benzothiazole series, those of the naphthothiazole series, those of the benzoselenazole series, those of the naphthoselenazole series, and those of the benzoxazole series, (2) at least one sensitizing dye selected from those represented by the following general formula:

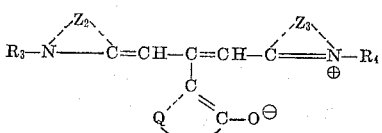

wherein $R_3$ and $R_4$ each represents an alkyl group, $Z_2$ represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series, $Z_3$ represents the non-metallic atoms necessary to complete a heterocyclic nucleus selected from the group consisting of those of the naphthothiazole series and those of the naphthoselenazole series, and Q represents the non-metallic atoms necessary to complete a nucleus selected from the group consisting of those of the indandione series, those of the barbituric acids series, those of the 2-thiobarbituric acid series, and those of the isoxazolone series, and (3) from 5 to 35 grams per mol. of silver halide of at least one metal salt selected from those represented by the following general formula:

$$M(X_1)_2$$

wherein M represents a member selected from the group consisting of a cadmium atom and a zinc atom and $X_1$ represents a member selected from the group consisting of a chlorine atom and a bromine atom.

4. A washed, photographic silver chlorobromide emulsion containing (1) at least one sensitizing dye selected from those represented by the following general formula:

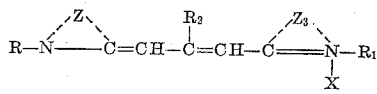

wherein R and $R_1$ each represents an alkyl group, $R_2$ represents a mononuclear aromatic group of the benzene series, X represents an acid radical, and Z and $Z_1$ each represents the non-metallic atoms necessary to complete a heterocyclic nucleus containing five atoms in the heterocyclic ring selected from the group consisting of those of the thiazole series, those of the benzothiazole series, those of the naphthothiazole series, those of the benzoselenazole series, those of the naphthoselenazole series, and those of the benzoxazole series, (2) at least one sensitizing dye selected from those represented by the following general formula:

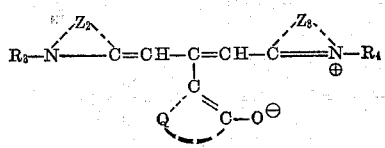

wherein $R_3$ and $R_4$ each represents an alkyl group containing from 1 to 2 carbon atoms, $Z_2$ represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series, $Z_3$ represents the non-metallic atoms necessary to complete a heterocyclic nucleus selected from the group consisting of those of the naphthothiazole series and those of the naphthoselenazole series, and Q represents the non-metallic atoms necessary to complete a nucleus selected from the group consisting of those of the indandione series, those of the barbituric acid series, those of the thiobarbituric acid series, and those of the isoxazolone series, and (3) from 5 to 35 grams per mol. of silver halide of cadmium chloride.

5. A washed, photographic silver chlorobromide emulsion containing (1) at least one sensitizing dye selected from those represented by the following general formula:

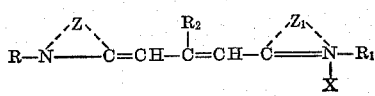

wherein R and $R_1$ each represents an alkyl group, $R_2$ represents a mononuclear aromatic group of the benzene series, X represents an acid radical, and Z and $Z_1$ each represents the non-metallic atoms necessary to complete a heterocyclic nucleus containing five atoms in the heterocyclic ring selected from the group consisting of those of the thiazole series, those of the benzothiazole series, those of the naphthothiazole series, those of the benzoselenazole series, those of the naphthoselenazole series, and those of the benzoxazole series, (2) at least one sensitizing dye selected from those represented by the following general formula:

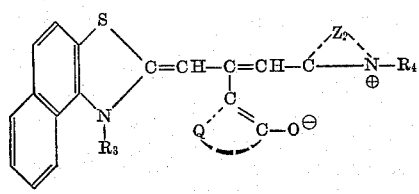

wherein $R_3$ and $R_4$ each represents an alkyl group containing from 1 to 2 carbon atoms, $Z_2$ represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series and Q represents the non-metallic atoms necessary to complete a nucleus selected from the group consisting of those of the indandione series, those of the barbituric acid series, those of the thiobarbituric acid series, and those of the isoxazolone series, and (3) from 5 to 35 grams per mol. of silver halide of cadmium chloride.

6. A washed, photographic gelatino-silver-chlorobromide emulsion as defined in claim 5 wherein $Z_2$ represents the non-metallic atoms necessary to complete a heterocyclic nucleus of the naphthothiazole series.

7. A washed, photographic gelatino-silver-chlorobromide emulsion containing (1) at least one sensitizing dye selected from those represented by the following general formula:

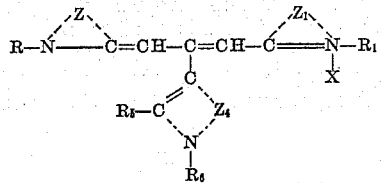

wherein R and $R_1$ each represents an alkyl group containing from 1 to 2 carbon atoms, $R_5$ and $R_6$ each represents a member selected from the group consisting of a hydrogen atom, an alkyl group, and an aryl group, $Z_4$ represents the non-metallic atoms necessary to complete a pyrryl nucleus, X represents an acid radical, and Z and $Z_1$ each represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, and those of the benzoxazole series, and (2) from 5 to 35 grams per mol. of silver halide of cadmium chloride.

8. A washed, photographic gelatino-silver-chlorobromide emulsion containing (1) at least one sensitizing dye selected from those represented by the following general formula:

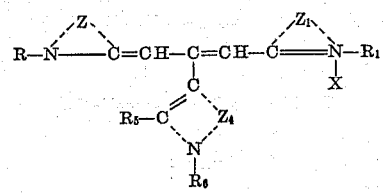

wherein R and $R_1$ each represents an alkyl group containing from 1 to 2 carbon atoms, $R_5$ and $R_6$ each represents a member selected from the group consisting of a hydrogen atom, an alkyl group containing from 1 to 12 carbon atoms, and an aryl group containing from 6 to 7 carbon atoms, $Z_4$ represents the non-metallic atoms necessary to complete a pyrryl nucleus, X represents an acid radical, and Z and $Z_1$ each represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, and those of the benzoxazole series, (2) at least one dye selected from those represented by the following general formula:

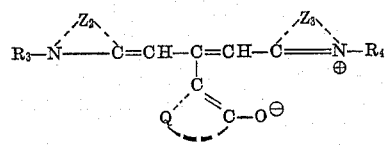

wherein $R_3$ and $R_4$ each represents an alkyl group containing from 1 to 2 carbon atoms, $Z_2$ represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series, $Z_3$ represents the non-metallic atoms necessary to complete a heterocyclic nucleus selected from the group consisting of those of the naphthothiazole series and those of the naphthoselenazole series, and Q represents the non-metallic atoms necessary to complete a nucleus selected from the group consisting of those of the indandione series, those of the barbituric acid series, those of the thiobarbituric acid series, and those of the isoxazolone series, and (3) from 5 to 35 grams per mol. of silver halide of cadmium chloride.

9. A washed, photographic gelatino-silver-chlorobromide emulsion containing (1) at least one sensitizing dye selected from those represented by the following general formula:

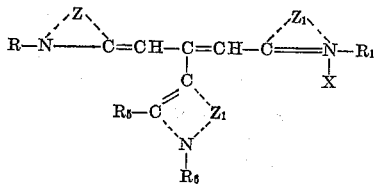

wherein R and $R_1$ each represents an alkyl group containing from 1 to 2 carbon atoms, $R_5$ and $R_6$ each represents a member selected from the group consisting of a hydrogen atom, an alkyl group containing from 1 to 12 carbon atoms, and an aryl group containing from 6 to 7 carbon atoms, $Z_4$ represents the non-metallic atoms necessary to complete a pyrryl nucleus, X represents an acid radical, and Z and $Z_1$ each represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, and those of the benzoxazole series, (2) at least one dye selected from those represented by the following general formula:

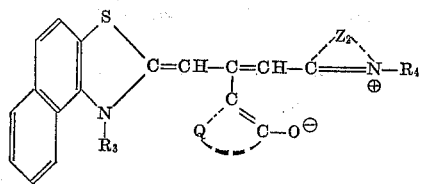

wherein $R_3$ and $R_4$ each represents an alkyl group containing from 1 to 2 carbon atoms, $Z_2$ represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series, and Q represents the non-metallic atoms necessary to complete a nucleus selected from the group consisting of those of the indandione series, those of the barbituric acid series, those of the thiobarbituric acid series, and those of the isoxazolone series, and (3) from 5 to 35 grams per mol. of silver halide of cadmium chloride.

10. A washed, photographic gelatino-silver-chlorobromide emulsion as defined in claim 9 wherein $Z_2$ represents the non-metallic atoms necessary to complete a heterocyclic nucleus of the naphthothiazole series.

11. A washed, photographic gelatino-silver-chlorobromide emulsion containing (1) at least one sensitizing dye selected from those represented by the following general formula:

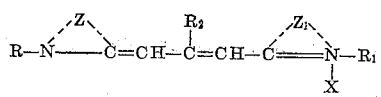

wherein R and $R_1$ each represents an alkyl group containing from 1 to 2 carbon atoms, $R_2$ represents a thienyl group, X represents an acid radical, and Z and $Z_1$ each represents the non-metallic atoms necessary to complete a heterocyclic nucleus selected from the group consisting of those of the thiazole series, those of the benzothiazole series, those of the naphthothiazole series, those of benzoselenazole series, those of the naphthoselenazole series, and those of the benzoxazole series, and (2) from 5 to 35 grams per mol. of silver halide of cadmium chloride.

12. A washed, photographic gelatino-silver-chlorobromide emulsion containing (1) at least one sensitizing dye selected from those represented by the following general formula:

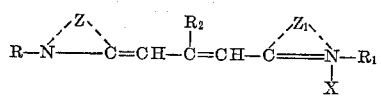

wherein R and $R_1$ each represents an alkyl group containing from 1 to 2 carbon atoms, $R_2$ represents a mononuclear aromatic group of the benzene series, X represents an acid radical, and Z and $Z_1$ each represents the non-metallic atoms necessary to complete a heterocyclic nucleus of the naphthothiazole series, and (2) from 5 to 35 grams per mol. of silver halide of cadmium chloride.

13. A washed, photographic gelatino-silver-chlorobromide emulsion sensitized with a supersensitizing combination comprising 3,3'-dimethyl-9-phenyl-4,5,4',5'-dibenzothiacarbocyanine bromide, 1,3-diethyl-5-[di(1-ethyl-2(1H) - β-naphthothiazolylidene)isopropylidene]barbituric acid, and from 5 to 35 grams per mol. of silver halide of cadmium chloride.

14. A washed, photographic gelatino-silver-chlorobromide emulsion sensitized with a supersensitizing combination comprising 3,3'-diethyl-9-phenylthiacarbocyanine iodide and from 5 to 35 grams per mol. of silver halide of cadmium chloride.

15. A washed, photographic gelatino-silver-chlorobromide emulsion containing (1) at least one sensitizing dye selected from those represented by the following general formula:

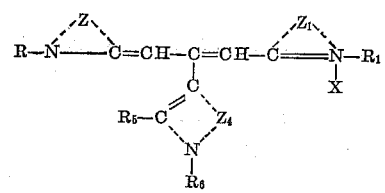

wherein R and $R_1$ each represents an alkyl group containing from 1 to 2 carbon atoms, $R_5$ and $R_6$ each represents a member selected from the group consisting of a hydrogen atom, an alkyl group containing from 1 to 12 carbon atoms, and an aryl group containing from 6 to 7 carbon atoms, $Z_4$ represents the non-metallic atoms necessary to complete a pyrryl ring, X represents an acid radical, and Z and $Z_1$ each represents the non-metallic atoms necessary to complete a heterocyclic nucleus of the naphthothiazole series, and (2) from 5 to 35 grams per mol. of silver halide of cadmium chloride.

16. A washed, photographic gelatino-silver-chlorobromide emulsion sensitized with a supersensitizing combination comprising 3,3'-dimethyl-9-(2- or 3-pyrryl)-4,5,4',5'-dibenzothiacarbocyanine-p-toluenesulfonate and from 5 to 35 grams per mol. of silver halide of cadmium chloride.

17. A washed, photographic, gelatino-silver-chlorobromide emulsion sensitized with a supersensitizing combination comprising 3,3'-dimethyl-9-(2-thienyl)-4,5-benzothiacarbocyanine-p-toluenesulfonate and from 5 to 35 grams per mol. of silver halide of cadmium chloride.

18. A washed, photographic gelatino-silver-chlorobromide emulsion containing (1) at least one sensitizing dye selected from those represented by the following general formula:

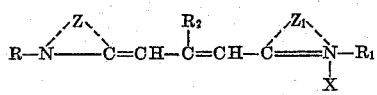

wherein R and $R_1$ each represents an alkyl group containing from 1 to 2 carbon atoms, $R_2$ represents a mononuclear aromatic group of the benzene series, X represents an acid radical, and Z and $Z_1$ each represents the non-metallic atoms necessary to complete a heterocyclic nucleus of the naphthoselenazole series, and (2) from 5 to 35 grams per mol. of silver halide of cadmium chloride.

19. A washed, photographic gelatino-silver-chlorobromide emulsion sensitized with a supersensitizing combination comprising 3,3'-diethyl-9-phenyl-4,5,4',5'-dibenzoselenacarbocyanine iodide and from 5 to 35 grams per mol. of silver halide of cadmium chloride.

20. A washed, photographic silver halide emulsion selected from the group consisting of a washed, photographic silver chloride emulsion and a washed, photographic silver chlorobromide emulsion containing (1) at least one sensitizing dye selected from those represented by the following general formula:

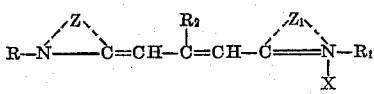

wherein R and $R_1$ each represents an alkyl group, $R_2$ represents a member selected from the group consisting of an aryl group, a pyrryl group, and a thienyl group, X represents an acid radical, and Z and $Z_1$ each represents the non-metallic atoms necessary to complete a heterocyclic nucleus containing five atoms in the heterocyclic ring, and (2) from 5 to 35 grams per mol. of silver halide of at least one water-soluble salt of a metal selected from the group consisting of cadmium and zinc.

References Cited in the file of this patent
UNITED STATES PATENTS

| | | |
|---|---|---|
| 2,284,877 | Martinez | June 2, 1942 |
| 2,399,083 | Waller | Apr. 23, 1946 |
| 2,432,865 | Dimsdale et al. | Dec. 16, 1947 |
| 2,517,541 | Christensen | Aug. 8, 1950 |
| 2,598,079 | Stauffer et al. | May 27, 1952 |
| 2,618,556 | Hewitson et al. | Nov. 18, 1952 |